(12) United States Patent
Jalava (10) Patent No.: US 8,019,850 B2
(45) Date of Patent: Sep. 13, 2011

(54) VIRTUAL PRIVATE NETWORK MANAGEMENT

(75) Inventor: Mika Jalava, Siuntio (FI)

(73) Assignee: Stonesoft Corporation, Helsinki (FI)

( * ) Notice: Subject to any disclaimer, the term of this patent is extended or adjusted under 35 U.S.C. 154(b) by 0 days.

(21) Appl. No.: 12/511,124

(22) Filed: Jul. 29, 2009

(65) Prior Publication Data

US 2009/0287810 A1 Nov. 19, 2009

Related U.S. Application Data

(62) Division of application No. 10/151,319, filed on May 21, 2002, now abandoned.

(30) Foreign Application Priority Data

Oct. 5, 2001 (FI) ..................... 20011949

(51) Int. Cl.
*G06F 15/173* (2006.01)
*G06F 15/16* (2006.01)

(52) U.S. Cl. .................. 709/223; 709/201; 709/229

(58) Field of Classification Search ............. 709/223, 709/201, 229
See application file for complete search history.

(56) References Cited

U.S. PATENT DOCUMENTS

| | | | | |
|---|---|---|---|---|
| 5,953,338 A * | 9/1999 | Ma et al. | .................. | 370/395.21 |
| 6,047,325 A * | 4/2000 | Jain et al. | ..................... | 709/227 |
| 6,079,020 A * | 6/2000 | Liu | ................. | 726/15 |
| 6,097,722 A * | 8/2000 | Graham et al. | .......... | 370/395.21 |
| 6,226,751 B1 * | 5/2001 | Arrow et al. | ..................... | 726/15 |
| 6,526,056 B1 * | 2/2003 | Rekhter et al. | ................ | 370/392 |
| 6,529,499 B1 * | 3/2003 | Doshi et al. | ................... | 370/352 |
| 6,636,898 B1 * | 10/2003 | Ludovici et al. | ............. | 709/250 |
| 6,678,835 B1 * | 1/2004 | Shah et al. | ........................ | 714/4 |
| 6,701,358 B1 * | 3/2004 | Poisson et al. | ............... | 709/223 |
| 6,751,729 B1 * | 6/2004 | Giniger et al. | ................ | 713/153 |
| 6,912,388 B2 * | 6/2005 | Yang | ......................... | 455/432.1 |
| 6,944,183 B1 * | 9/2005 | Iyer et al. | ..................... | 370/466 |
| 6,954,790 B2 * | 10/2005 | Forslow | ....................... | 709/227 |
| 7,136,374 B1 * | 11/2006 | Kompella | ..................... | 370/352 |
| 7,274,704 B1 * | 9/2007 | Ould-Brahim et al. | ....... | 370/409 |
| 7,403,980 B2 * | 7/2008 | Stringer-Calvert et al. | .. | 709/220 |
| 7,574,495 B1 * | 8/2009 | Rajagopalan | ................. | 709/223 |
| 2001/0044842 A1 * | 11/2001 | Kawakami | .................... | 709/223 |
| 2002/0022481 A1 * | 2/2002 | Yang | ............................. | 455/432 |
| 2002/0055989 A1 * | 5/2002 | Stringer-Calvert et al. | .. | 709/220 |
| 2002/0091815 A1 * | 7/2002 | Anderson et al. | ............ | 709/223 |
| 2002/0093915 A1 * | 7/2002 | Larson | .......................... | 370/235 |
| 2002/0097725 A1 * | 7/2002 | Dighe et al. | ................ | 370/395.1 |
| 2002/0124090 A1 * | 9/2002 | Poier et al. | ..................... | 709/228 |
| 2002/0133534 A1 * | 9/2002 | Forslow | ........................ | 709/200 |
| 2002/0144144 A1 * | 10/2002 | Weiss et al. | ................... | 713/201 |

(Continued)

OTHER PUBLICATIONS

Kositpaiboon, Rungroj et al., "Customer Network Management for B-ISDN/ATM Services", Proceedings of the International Conference on Communications, IEEE (New York), p. 1-7 (May 23, 2003).

*Primary Examiner* — Alina N. Boutah
(74) *Attorney, Agent, or Firm* — Barnes & Thornburg LLP (57) ABSTRACT

The invention provides a centralized VPN management of a plurality of VPN sites by means of a VPN Information Provider (VIP). Management of a VPN device is distributed so that at least part of the VPN configuration is centrally managed without giving away control of the firewall rulebase or other critical local configuration used in the VPN device.

25 Claims, 6 Drawing Sheets

U.S. PATENT DOCUMENTS

| | | | |
|---|---|---|---|
| 2002/0152373 A1* | 10/2002 | Sun et al. .................... 713/150 |
| 2002/0161925 A1* | 10/2002 | Munger et al. ............... 709/241 |
| 2002/0198840 A1* | 12/2002 | Banka et al. .................. 705/50 |
| 2003/0028624 A1* | 2/2003 | Hasan et al. .................. 709/220 |
| 2003/0030662 A1* | 2/2003 | Poisson et al. ............... 345/735 |
| 2003/0032409 A1* | 2/2003 | Hutcheson et al. .......... 455/414 |
| 2003/0041136 A1 | 2/2003 | Cheline et al. |
| 2003/0055933 A1 | 3/2003 | Ishizaki et al. |
| 2003/0055990 A1 | 3/2003 | Cheline et al. |
| 2003/0177221 A1* | 9/2003 | Ould-Brahim et al. ....... 709/223 |
| 2005/0022183 A1* | 1/2005 | Poisson et al. ................ 718/1 |

* cited by examiner

Fig. 1

Prior Art

Fig. 2

Prior Art

VIRTUAL PRIVATE NETWORK MANAGEMENT

CROSS-REFERENCE TO RELATED APPLICATIONS

The present application is a Divisional of U.S. patent application Ser. No. 10/151,319, filed 21 May 2002, now abandoned, which claims the benefit of priority to Finland Patent Application No. 20011949, filed 5 Oct. 2001, the contents of which are incorporated herein by reference in their entirety.

BACKGROUND OF THE INVENTION

The invention relates in general to Virtual Private Networks (VPN). In particular the invention relates to managing VPNs.

Public networks are presently being used more and more for sensitive and mission critical communications and the internal networks of various organisations and enterprises are nowadays connected to the public networks, Internet being one of them. Since the basic mechanisms of the public networks were originally not designed with secrecy and confidentiality in mind, public networks are untrusted networks.

Virtual Private Networks (VPN) are commonly used for connecting trusted parties to each other over untrusted public network through a secure tunnel. All traffic from a first party to a second party is encrypted in a security gateway of the first party, sent in encrypted form over the public network to the second party, where the transmitted data is decrypted in a security gateway and the decrypted data is forwarded to the recipient. The VPN is typically transparent to the processes that are communicating between each other and the encryption and decryption depend on the configuration of the VPN between the parties. However, the security gateways need to have information about the configuration of the other end of the VPN in order to be able to encrypt and decrypt the traffic correctly. The configuration includes things like addressing, encryption algorithm and key information of the other end security gateway. The configuration information is usually conveyed between the administrators of different sites by means of phone or some other traditional communication system. The administrators then input the configuration to the security gateways of their sites in order to enable VPN connections between the sites. The actual encryption keys are exchanged in VPN communication, but the configuration that is needed for initiating VPN connection needs to be conveyed by some other means.

Large VPNs are complicated and tedious to manage. Keeping the information about the structure of the VPN up to date at each site (network or group of networks connected to the VPN) is problematic but mandatory. Every site must have the correct configuration for all the other sites in order to communicate with them. In large VPNs there may be dozens or hundreds of sites and the configuration may vary in time rather frequently, and if the configuration of one VPN site changes all sites need to be updated. That is, the administrator of the sites changing its configuration needs to contact administrators of all other sites and communicate the changes to them, whereby they need to re-configure their security gateways.

Figure 1:
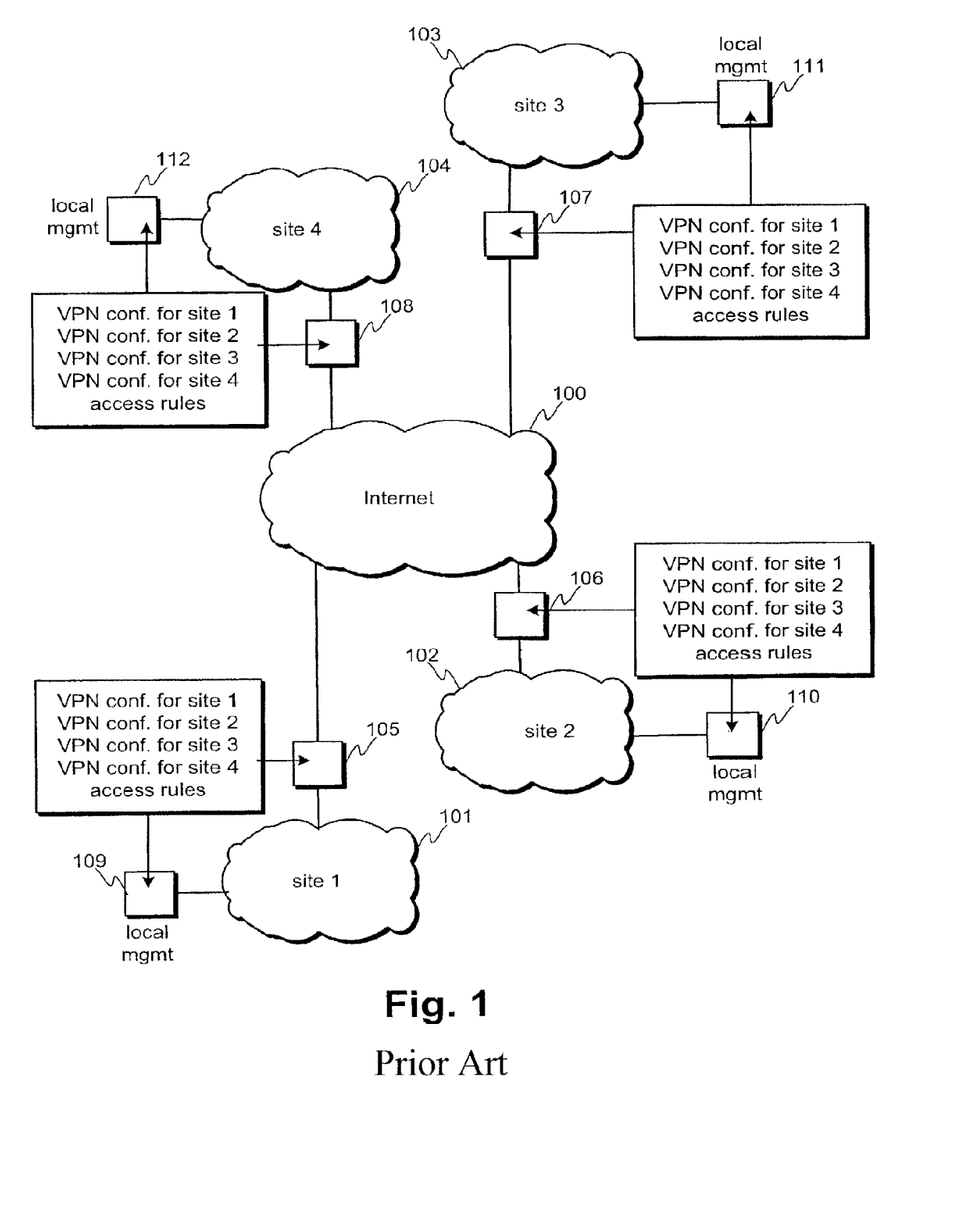
FIG. 1 illustrates an example network topology.

FIG. 1 illustrates an example network topology with four sites 101-104, who are able to communicate with each other by means of VPNs. The sites 101-104 are connected to the Internet 100 via security gateways 105-108. Each security gateway is managed via a site-specific management server 109-112, which usually resides inside respective site and to each site there is configured VPN configuration information of all other sites as well as the configuration of the site itself. In case the security gateway functions as a firewall; the firewall configuration (access rules) of the security gateways is naturally not duplicated to the other sites.

One proposal for managing large VPNs is a star like VPN, where a central "hub" acts as a VPN router. Each site connects to the hub, which decrypts the packets and then re-encrypts them for the connection from the hub to the target site. This way, the VPN sites do not need to have up-to-date VPN information of all other sites; instead it is enough to be able to connect to the central hub.

Figure 2:
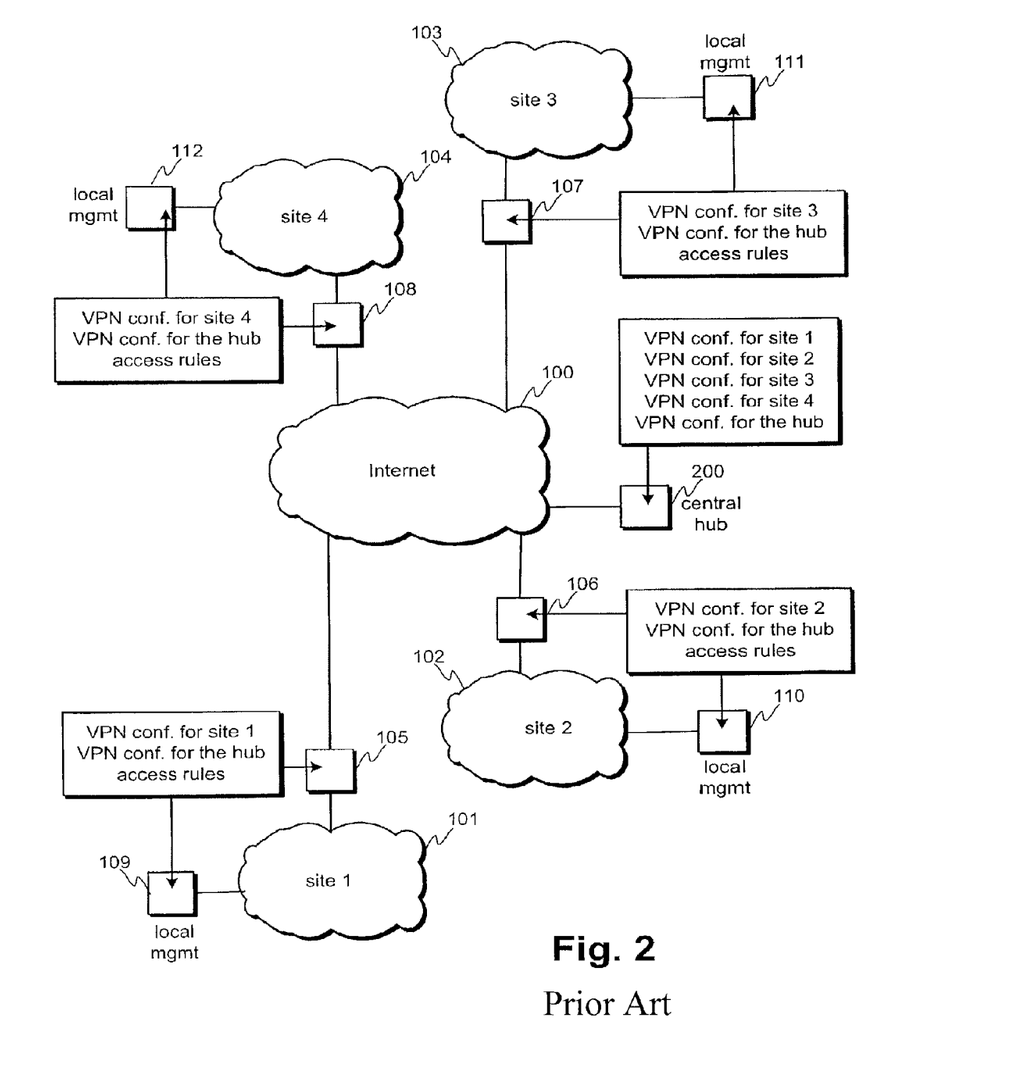
FIG. 2 illustrates a star like VPN topology.

FIG. 2 illustrates the network topology of FIG. 1 in connection with the star like VPN. The sites include now only VPN configuration of the site itself and of a central hub 200. The central hub includes VPN configuration of all the sites in the configuration, and the sites connect to each other via the central hub.

The disadvantage of the star like VPN is that vast amounts of processing power are required at the hub. The security gateway at each site still has the same amount of encryption load as in a standard distributed VPN, but the hub's load is in fact equal to the sum of the loads of all the sites. In large-scale VPNs this may be difficult or impossible to achieve and in any case very expensive. Furthermore, the data transmitted in the VPNs is in cleartext form within the hub, which is clearly a security risk.

If all the sites belonging to a VPN belong to the same organization, it is possible to administer them centrally by means of existing tools. In this case, all aspects of the security gateways, including access control configuration, are managed from one central point. However, the sites joining a VPN are not always sites of one party, but many different organizations may wish to establish a VPN between them. Clearly, such central management of all aspects of security gateways is not suitable, if different organizations are involved. Therefore a new way to manage VPNs of more than one organisation and especially large VPNs is required.

SUMMARY OF THE INVENTION

An object of the invention is to provide a method for managing VPN devices, which avoids or alleviates the problems mentioned above. The object is achieved according to the invention as disclosed in the attached independent claims. Preferred embodiments of the invention are disclosed in the dependent claims. The features described in one dependent claim may be further combined with features described in another dependent claim to produce further embodiments of the invention.

The idea of the invention is to provide a centralized VPN management of a plurality of VPN sites by means of a VPN Information Provider (VIP). The security gateway (or other VPN device) management is distributed so that at least part of the VPN configuration (especially the part consisting of site addressing, used encryption algorithms and key management) is centrally managed without giving away control of the firewall rulebase or other critical local configuration used in the security gateway. There may be several VPNs handled by different VIPs, so that an organization using the invention can flexibly join several independent VPNs.

The VIP according to the invention is a mutually trusted party, from which the parties joining a VPN are willing to accept configuration information.

According to a first aspect of the invention a method for managing VPN devices comprises maintaining in a VPN Information Provider (VIP) VPN configurations of VPN devices belonging to a first VPN, providing from the VIP to a first VPN device belonging to the first VPN, VPN configuration of at least one other VPN device belonging to the first VPN, and managing certain aspects of said first VPN device belonging to the first VPN from at least one other management system.

According to a second aspect of the invention a method for managing VPN device comprises maintaining in a first VPN Information Provider (VIP) VPN configurations of VPN device belonging to a first VPN, maintaining in a second VPN Information Provider (VIP) VPN configurations of VPN device belonging to a second VPN, and providing to a first VPN device belonging to the first and second VPNs, VPN configuration of at least one other VPN device belonging to the first VPN from the first VIP and VPN configuration of at least one other. VPN device belonging to the second VPN from the second VIP.

The configuration of at least one other VPN device may be provided directly to said first VPN device or via at least one other management system.

Own VPN configuration of a given VPN device may be defined in the VIP or in some other management system, from where the configuration is provided to the VIP for maintenance.

Providing the configuration(s) of other VPN devices to a VPN device may be done by sending to a first VPN device belonging to the first VPN, information about the VPN configurations maintained in the VIP, and by requesting from the first VIP VPN configuration of another security gateway belonging to the first VPN when needed. Said information about the VPN configurations maintained in the VIP may be for example a set of addresses included in the first VPN. (The set of addresses may be a single address range or plurality of address ranges related to different sites included in the VPN.) In that case, the request from the first VPN device comprises an address included in the first VPN, and said other VPN device is identified in the VIP by finding a VPN device related to said address. Said information about the configurations— that is, the set of addresses—may be sent to the VPN devices after a change in the set of addresses included in the first VPN, or after a predefined time has elapsed since the information was sent the last time.

Alternatively the VIP may send, to VPN devices belonging to the first VPN, VPN configurations maintained in the VIP, so that the configurations are readily available in the VPN devices when needed. The VPN configurations maintained in the VIP may be sent for example after a new VPN configuration has been added to the VIP, after an old VPN configuration has been removed from the VIP, after a VPN configuration of at least one VPN device has been changed in the VIP, or after a predefined time has elapsed since the configurations were sent the last time. That is, all changes need to be instantly conveyed to the VPN devices.

In either of the above cases, the VIP may send only changes or additions to the information or configurations previously sent (an incremental update) or all available information or configurations (a full update).

According to a third aspect of the invention a method for handling VPN configuration in a VPN device comprises receiving a packet directed to a destination address in a first VPN, requesting and receiving VPN configuration for a VPN device related to said destination address from a VPN Information Provider (VIP) administering the first VPN, and using said VPN configuration for establishing a VPN tunnel to said VPN device related to said destination address for reaching said destination address.

In this context, a VPN device related to a destination address refers to the VPN device, which is securing the site, to which the destination address belongs. In order to communicate to the destination address, a VPN tunnel needs to be created to this VPN device.

According to a fourth aspect of the invention a method for handling VPN configuration in a VPN Information Provider (VIP) comprises maintaining VPN configurations of VPN devices belonging to a first VPN, providing to VPN devices belonging to the first VPN, information about the VPN configurations maintained in the VIP, receiving from a first VPN device belonging to the first VPN, a request for VPN configuration of another VPN device belonging to the first VPN, and sending to said first VPN device belonging to the first VPN, the VPN configuration of the other VPN device as a response to the request.

According to the invention all entire encryption/decryption load is addressed to the firewalls or security gateways protecting the sites, while the VPN administration is centralized by means of VIPs to achieve consistent configuration at every site. Also there is no centralized location where all the traffic is in cleartext form as in the central hub arrangement, so the communication is more secure than in a star like structure.

The method of the invention enables flexible management of a VPN between several autonomous organizations. Additionally, providing VPN management as a service is enabled. That is, the invention offers MSPs (Managed Service Providers) a possibility to provide a new type of service by means of VIPs. VPN configuration is managed separately from other configuration information and therefore management of VPN configuration can be securely outsourced and an organization can easily join different VPNs, which may be administered by a plurality of different VIPs.

These and other features of the invention, as well as the advantages offered thereby, are described hereinafter with reference to embodiments illustrated in the accompanying drawings.

DETAILED DESCRIPTION OF THE INVENTION

FIGS. 1 and 2 are discussed in more detail above in connection with the prior art description.

In the following description the invention is mainly disclosed in connection with a VPN capable firewall implementation. However, the method of the invention can be applied straightforwardly also in any security gateway without firewall functionality as well as in a VPN client solution, which provides VPN connectivity for a single (and often mobile) host. Additionally, the invention can be used in connection with dynamic security gateway (gateways, which do not have a static IP-address). Therefore, the invention can be employed in any device acting as an endpoint of a VPN.

According to one aspect of the invention VPN device's own VPN configuration is defined and maintained in a local management system, or in MSP's management system, if the VPN device is administered by an MSP. The VPN configuration may be defined together with access rule configuration of the VPN device, if the VPN device acts as a firewall. However, the VPN device may be only a simple encryption/decryption endpoint of a VPN without firewall functionality. When the site behind the VPN device wants to join for example VPN1, the VPN configuration of the VPN device is provided to VIP1, which is managing VPN1. Alternatively, the VPN configuration may be provided to the gateway from the VIP1.

VIP1 provides the VPN device with VPN configurations of other endpoints belonging to VPN1 or information about the configuration of the VPN1 as a whole. In the former case, the VPN device uses the configuration normally for communicating over VPN1 and VIP1 takes care of that the configuration, which the VPN device has, is up-to-date. In the latter case, the VPN device queries the actual configuration from the VIP1 when needed.

It must be appreciated that the arrangement of the invention does not compromise security of the VPNs, even though the VPN configuration information of all sites is available from a central point (VIP). The configuration includes the authentication keys of the sites, that is the end points of the VPNs, but in VPN each connection is encrypted with connection specific keys, which are negotiated between the communicating sites, and thus knowing the authentication key of a site does not enable breaking into a VPN connection.

Figure 3:
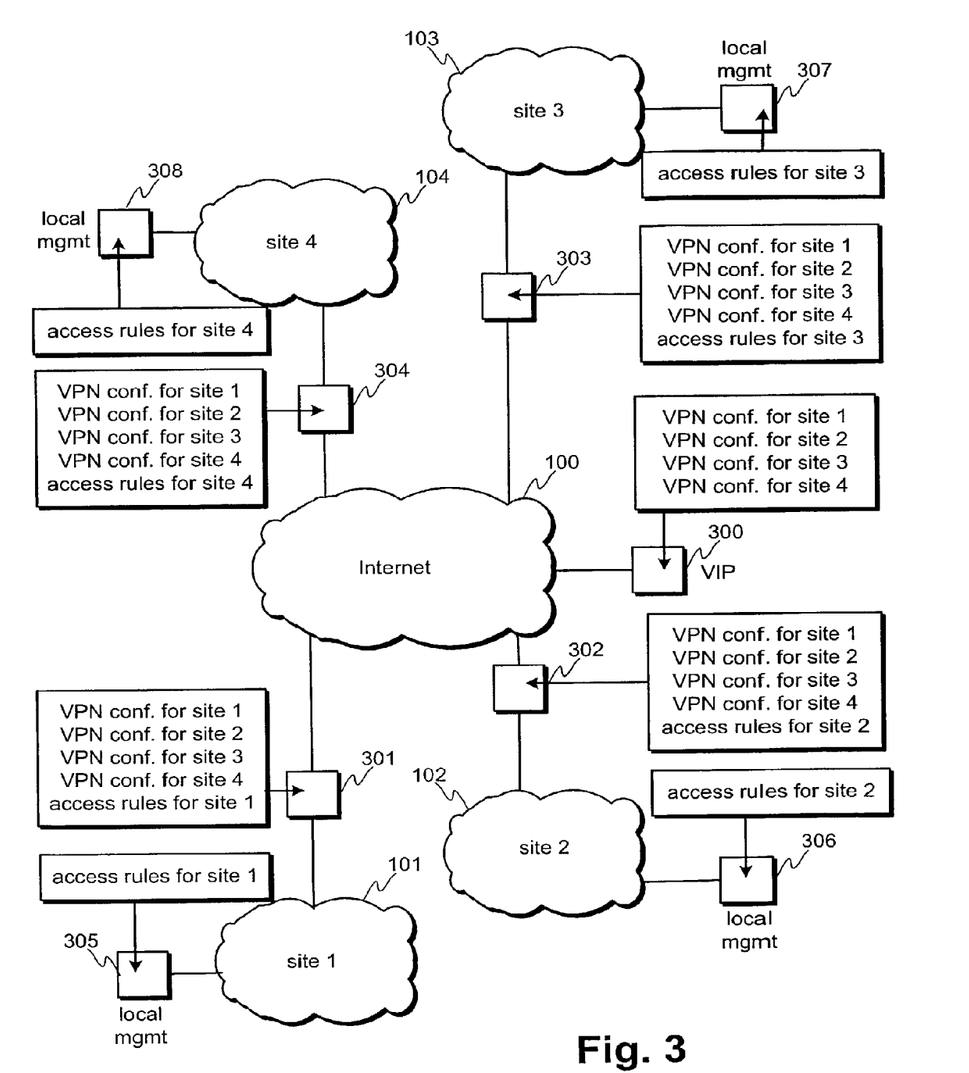
FIGS. 3, 4 and 5 illustrate example network topologies according to the invention.

FIG. 3 illustrates an example network topology according to one aspect of the invention. The sites of the FIG. 1 are secured by security gateways 301-304, which include the VPN configuration related to the VPN between the sites for other sites as in prior art. Thus, the security gateways are taking care of all encryption tasks. However, now the local management systems 305-308 do not take care of providing the VPN configuration to the security gateways VPN configuration information of the sites is loaded to the security gateways from a VPN Information Provider (VIP) 300. It must be noted herein, that even though only one VIP is shown in the Figure, VPN configuration for some other VPN may be loaded to the security gateways from some other VIP, and that the number of different VPN configurations and VIPs used is not restricted.

When configuration of one site is changed the change needs to be done only in the VIP from which the updated configuration is then loaded to security gateways of all sites. The VIP loads the configuration to the security gateways for example every time after a change occurs in the configuration. The change may be an addition or removal of a site or modification of some site's configuration. In addition, the VIP may push the configuration information to the security gateways after certain time interval has elapsed since the configuration was pushed the last time in order to minimize the possibility that the sites would not have up-to-date configuration. The security gateways use the VPN configuration loaded from the VIP in the same way, as they would use configuration loaded from a local management system. The security gateways basically need to be configured to accept configuration from the VIP, but otherwise their operation does not need to be altered. The communication between the VIP and the security gateways is encrypted by some suitable means; for example Secure Sockets Layer (SSL) protocol may be used for this. In addition to this some parts of the configuration of the security gateways, e.g. configuration not related to the VPNs, and/or possible access rules related to the VPN are managed from site-specific local management systems 305-308.

Instead of pushing the whole configuration to the security gateways after every change, the VIP may push only indication that the configuration has changed and the security gateway may initiate the transfer of updated configuration from the VIP to the security gateway.

Figure 4:
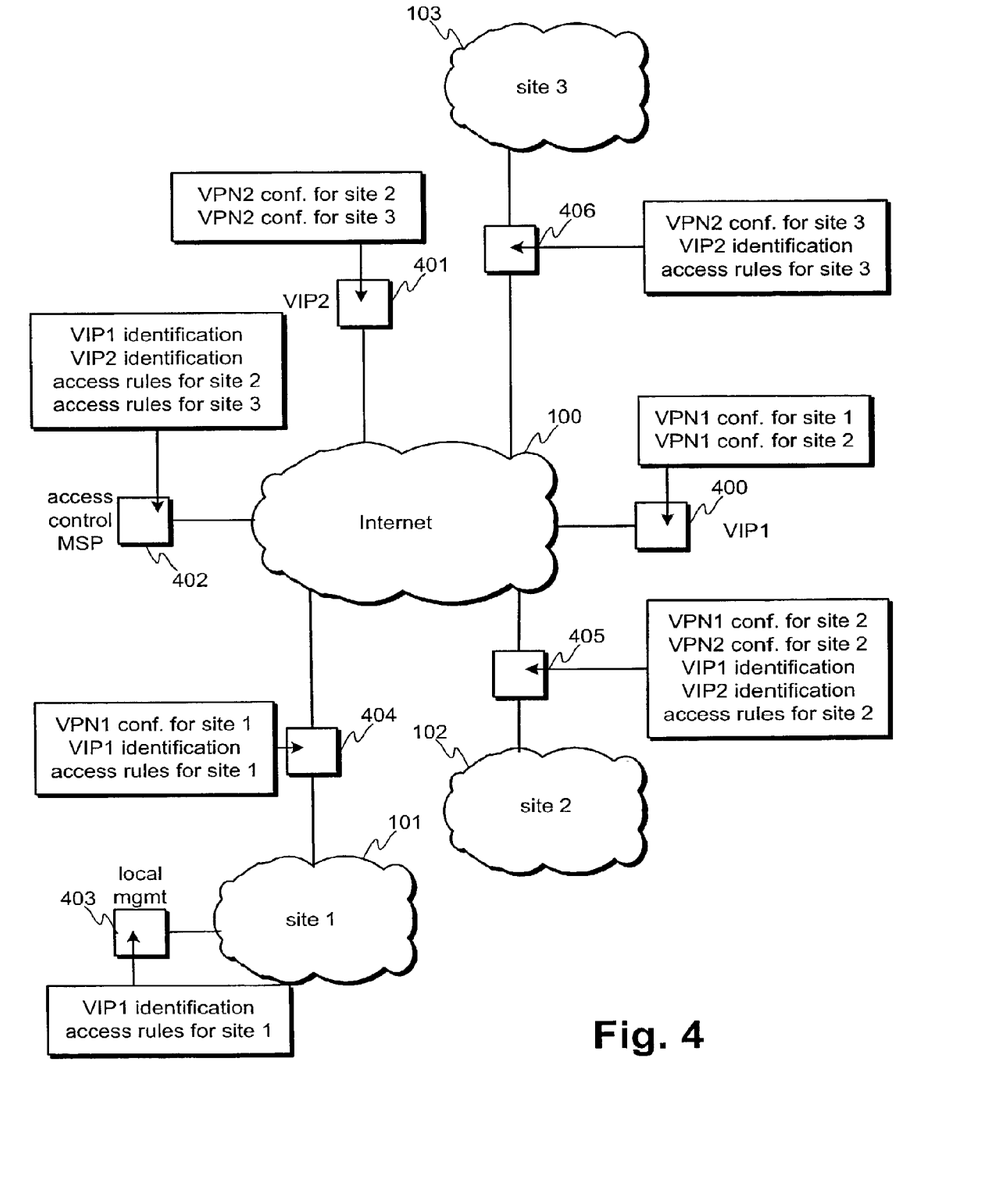

FIG. 4 illustrates an example network topology according to another aspect of the invention. Here three sites are secured by means of security gateways 404-406, out of which security gateway 404 is managed from a local management 403 and security gateways 405 and 406 are managed from MSP's management-system 402. Naturally MSP's management connection to the security gateways 405 and 406 does not need to be over the Internet as shown in the Figure, but can be for example leased line. Security gateways of sites 1 and 2, which join in VPN1, are provided with identification information for VIP1 400 (VIP identification is defined in a local management or in MSPs management system), which is administering VPN1. The sites receive VPN configuration for VPN1 from VIP1. Equally, security gateways of sites 2 and 3, which join in VPN2, are provided with identification information for VIP2 401, which is administering VPN2, and receive VPN configuration for VPN2 from VIP2. Thus, security gateway 405 of site 2 has identification information for both VIP1 and VIP2. When a security gateway detects a packet, which is destined to a host in a VPN the security gateway belongs to, the security gateway queries VPN configuration needed for establishing a VPN tunnel for reaching the host.

In this scenario, all VPN configurations are not distributed to the security gateways. Instead, the security gateways query the configuration from the VIP when needed. In order to be able to query configuration, the security gateways need to know from which VIP to query it. For this purpose, the VIPs send to security gateways information about the configurations they have. This information may be for example a list of IP-addresses included in the VPN or list of VPN sites included in the VPN. In principle this means the addresses, which can be reached over by means of the respective VPN. In the latter case the specific other endpoint (other VPN device and its configuration) to which a certain VPN tunnel should be destined is provided to a security gateway only when needed. The benefit of this solution is that smaller amount of data needs to be distributed to the security gateways. Since it is likely that in many VPN's all gateways do not communicate with all other gateways, all gateways do not necessarily need configuration for all possible other endpoints. Moreover, only fundamental changes in the configuration of the whole VPN trigger the need to distribute data to all security gateways. Since configuration of a gateway is queried from the VIP before use, minor changes in configuration of one security gateway do not need to be immediately communicated to all other security gateways. Only if a new site is added or removed from the VPN, i.e. the address range of the VPN changes, all security gateways need to be informed of the change.

In addition, this arrangement enables the use of dynamic security gateways. If a security gateway obtains its address dynamically, for example from a DHCP (Dynamic Host Configuration Protocol) server, other gateways cannot know from which address the dynamic security gateway is reached at a given time. Now, addresses behind the dynamic security gateway can be maintained in a VIP and conveyed to other gateways from there. Then the dynamic security gateway informs the VIP of its current address every time its address changes. The VIP then conveys the current address to another gateway when needed (other gateways query the current address on the basis of an address included in the site of the dynamic gateway). Since the address of a dynamic gateway may change at any given time, e.g. due to connectivity failures, and other gateways may cache configurations received from a VIP for future use, there is a possibility that a security gateway has an out-of-date configuration for a dynamic gateway. Therefore, it is beneficial that the VIP tags the configuration of a dynamic security gateway differently from static configurations. In this way, a security gateway can for example adjust the time a configuration of a dynamic gateway is cached or otherwise treat dynamic and static entries differently.

Figure 5:
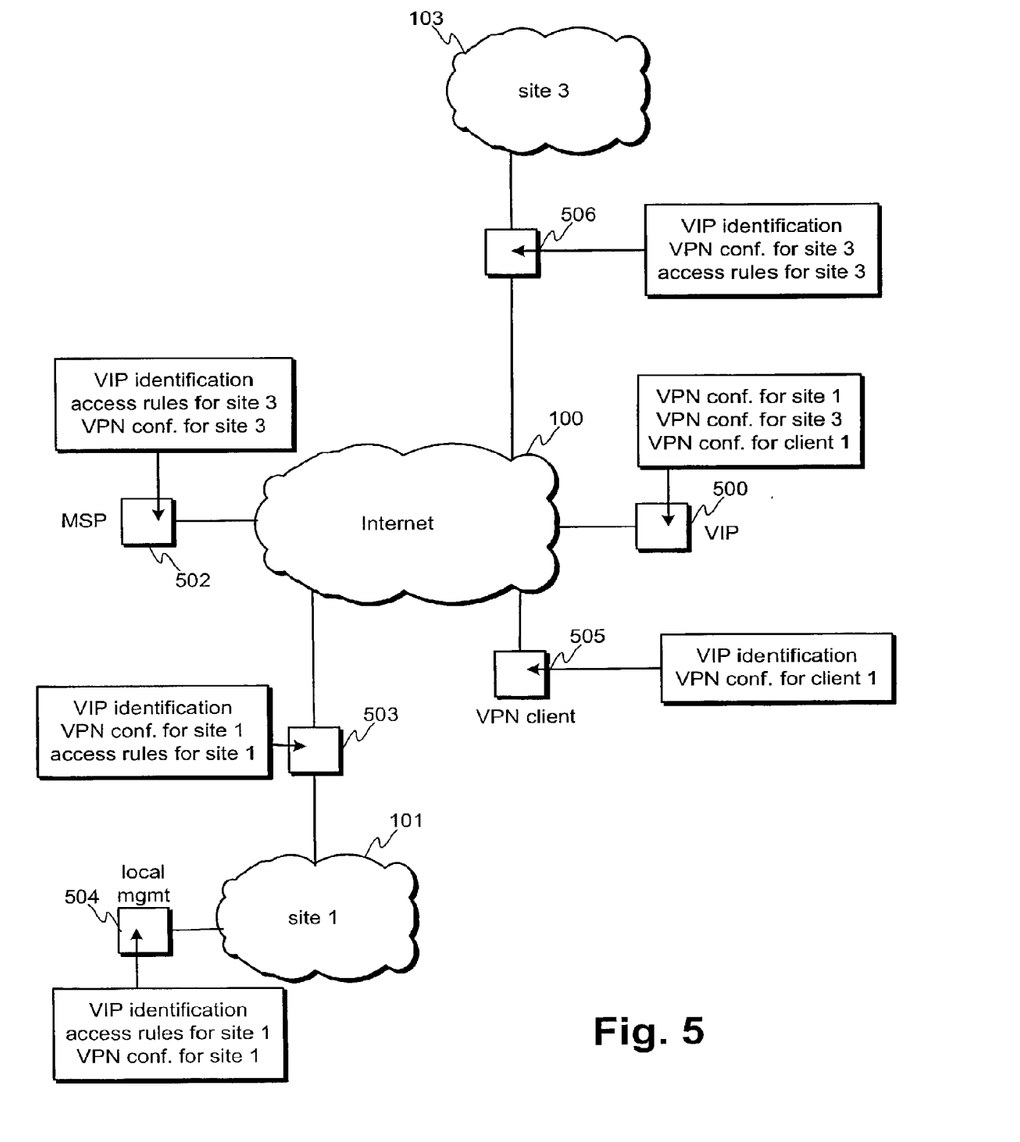

FIG. 5 illustrates an example network topology according to still other aspect of the invention. Therein security gateways 503 and 506 of sites 1 and 3 are managed by local management 504 and MSP 502, respectively. VPN configurations of the security gateways defined in the local management or MSP. The configurations are provided to a VIP 500 and maintained therein. It should be noted herein that when the VIP receives VPN configuration of a security gateway, it could check if the configuration is compatible with VPN policy of the VIP and with VPN configurations of the other security gateways belonging to the VPN. This can be done by simply comparing the new configuration to configurations of other gateways. When the security gateways are establishing a VPN tunnel they first query the configuration of the other endpoint from the VIP. (This is described in more detail above in connection with FIG. 4.)

In addition to the sites 1 and 3 belonging to the VPN, there is a VPN client 505 joining in the VPN as well. The VPN configuration of the VPN client is maintained in the VIP in similar way as the configurations of the dynamic security gateways.

The example implementations of the invention illustrated in FIGS. 3 to 5 are not meant to be restrictive. Instead, implementation details related to one example may be combined to the details of another example in any suitable way.

The VIP and the VPN devices (security gateways, firewalls, VPN clients) according to the invention may be implemented as a suitable combination of hardware and software. Typically the implementation is software program code executed in a processor unit combined with suitable memory resources.

A major part of the implementation of the invention is a change in the handling of the configuration in the VPN device. A VPN device according to the invention is adapted to receive configuration from more than one management entity, e.g. from a local management and a VIP. In general VIP provides VPN configuration and local management provides access rule configuration. However, local management may provide VPN configuration as well. The VPN device is adapted to identify different VIP for example by means of certificates. In addition, VPN device may check, if a VPN configuration received from a VIP is in accordance with other configuration of the VPN device, before accepting the configuration for use.

A VIP can be basically similar to a centralized VPN management system able to handle VPN devices; the VIP includes thus capability to define VPN configurations and to upload them to the VPN devices. Alternatively, a VIP may accept readily defined VPN configurations for maintenance. In this case the VIP administering a VPN is preferably adapted to confirm that a received new configuration is compatible with the configurations of other gateways belonging to the VPN. In addition a VIP according to one aspect of the invention comprises mechanism for providing VPN devices with information about the configurations maintained in the VIP and sending configuration to VPN devices on demand, that is, as a response to a request.

Figure 6:
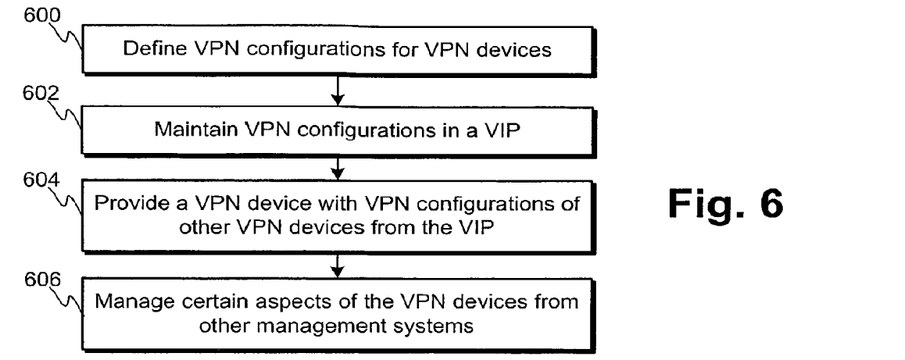
FIG. 6 is a flow chart illustrating management of VPN devices according to an aspect of the invention.
Figure 7:
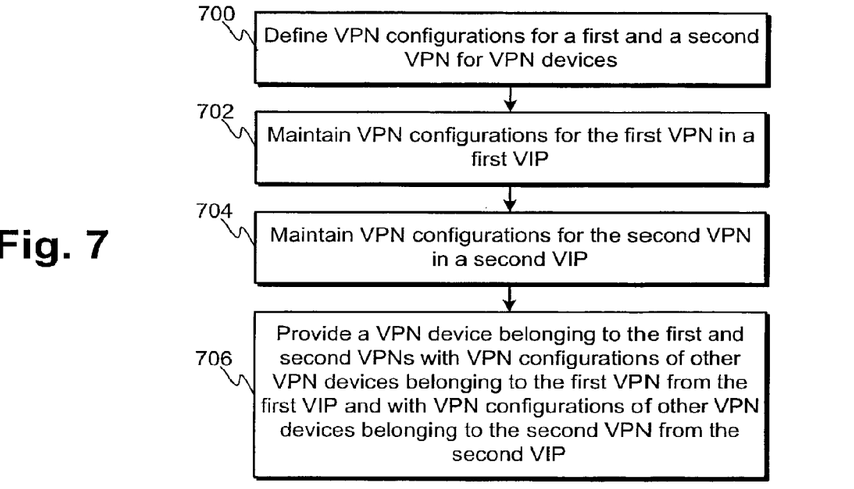
FIG. 7 is a flow chart illustrating management of VPN devices according to another aspect of the invention.
Figure 8:
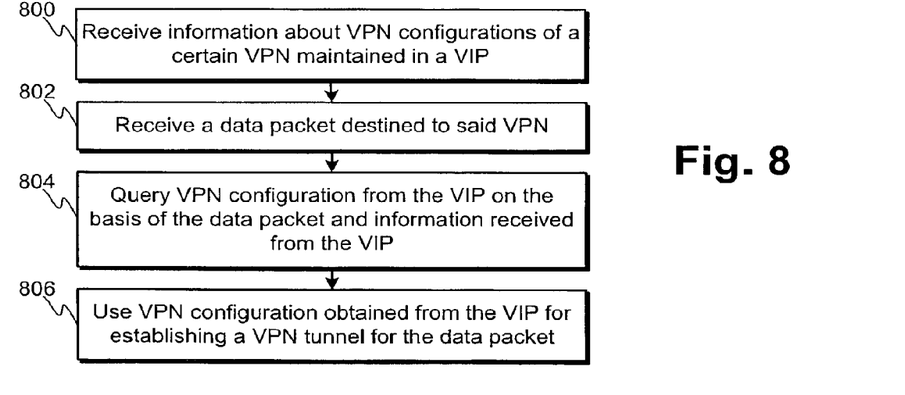
FIG. 8 is a flow chart illustrating handling of VPN configuration in a VPN device according to still other aspect of the invention.

Features of the invention are further illustrated in the flow charts of FIGS. 6, 7 and 8. FIG. 6 is a flow chart illustrating management of VPN devices according to an aspect of the invention. In steps 600 and 602, VPN configurations are defined for VPN devices and the configurations are maintained in a VIP. The VPN configuration of a given VPN device may be defined in the VIP or in some other management system, from where the configuration is provided to the VIP for maintenance. Then in step 604, a VPN device is provided with VPN configuration of some other VPN device by means of sending the configuration from the VIP. In step 606 certain aspects of the VPN devices are managed from some other management system. Such aspects may be for example access rule configurations or configurations related to some other VPN configuration.

FIG. 7 is a flow chart illustrating management of VPN devices according to another aspect of the invention. Therein, VPN configurations are defined for VPN devices belonging to first and second VPNs in step 700. The configurations for the first VPN are maintained in a first VIP and the configurations for the second VPN are maintained in a second VIP in steps 702 and 704 respectively. Also in this case the VPN configuration of a given VPN device may be defined in a VIP or in some other management system, from where the configuration is provided to the respective VIP for maintenance. Then in step 706, a VPN device belonging to the first and second VPNs obtains VPN configuration of at least one other VPN device belonging to the first VPN from the first VIP and VPN configuration of at least one other VPN device belonging to the second VPN from the second VIP.

FIG. 8 is a flow chart illustrating handling of VPN configuration in a VPN device according to still other aspect of the invention. In step 800, the VPN device receives information about the VPN configurations maintained in a VIP (e.g. set of addresses included in the respective VPN). Then the VPN device receives a data packet destined to the VPN in step 802. On the basis of the information received from the VIP the VPN device queries VPN configuration from the VIP in step 804 and uses VPN configuration obtained from the VIP for establishing a VPN tunnel for the data packet.

It will be apparent for those skilled in the art that the illustrative embodiments described are only examples and that various modifications can be made within the scope of the invention as defined in the appended claims.

The invention claimed is:

1. A method for managing Virtual Private Network (VPN) devices, the method comprising:

maintaining in a first centralized VPN Information Provider (VIP), multiple VPN configurations of VPN devices belonging to a first VPN, wherein more than one organization or VPN site is participating in the first VPN with at least one device, providing, from the first centralized VIP to a first VPN device belonging to the first VPN, VPN configuration of at least one other VPN device of another organization participating in the first VPN, the VPN configuration being one of said multiple VPN configurations, and managing a subset of security aspects of said first VPN device belonging to the first VPN from at least one other management system separate from the first centralized VIP, wherein said subset of security aspects should not be shared by all organizations, VPN sites or VPN devices belonging to the first VPN.

2. The method of claim 1, wherein said VPN configuration of at least one other VPN device is provided from the centralized VIP to said first VPN device via said at least one other management system.

3. The method of claim 1, wherein said VPN configuration of at least one other VPN device is provided from the centralized VIP directly to said first VPN device.

4. The method of claim 1, further comprising:
defining said VPN configurations of said VPN devices belonging to the first VPN in said at least one other management system, and
providing said VPN configurations to the first centralized VIP for maintenance.

5. The method of claim 1, further comprising:
defining said VPN configurations of said VPN devices belonging to the first VPN in the first centralized VIP, and
providing said VPN configurations to respective VPN devices.

6. The method of claim 1, wherein the providing of VPN configuration of at least one other VPN device belonging to the first VPN comprises:
sending to VPN devices belonging to the first VPN, information about the VPN configurations maintained in the first centralized VIP,
receiving from a first VPN device belonging to the first VPN, a request for VPN configuration of another VPN device belonging to the first VPN, and
sending to said first VPN device belonging to the first VPN, the VPN configuration of the other VPN device as a response to the request.

7. The method of claim 6, wherein said information about the VPN configurations maintained in the first centralized VIP is a set of addresses included in the first VPN, said request from the first VPN device comprises an address included in the first VPN, and said other VPN device is identified in the first centralized VIP by finding a VPN device related to said address.

8. The method of claim 6, wherein said information about the VPN configurations maintained in the first centralized VIP is a set of addresses included in the first VPN, and said information is sent after a change in the set of addresses included in the first VPN, or after a predefined time has elapsed since the information was sent the last time.

9. The method of claim 1, wherein the providing of VPN configuration of at least one other VPN device belonging to the first VPN comprises:
sending to VPN devices belonging to the first VPN, VPN configurations maintained in the first centralized VIP.

10. The method of claim 9, wherein said VPN configurations maintained in the first centralized VIP are sent after a new VPN configuration has been added to the VIP, after an old VPN configuration has been removed from the first centralized VIP, after a VPN configuration of at least one VPN device has been changed in the first centralized VIP, or after a predefined time has elapsed since the configurations were sent the last time.

11. A method for managing Virtual Private Network (VPN) devices, the method comprising:
maintaining in a first centralized VPN Information Provider (VIP), multiple VPN configurations of VPN devices belonging to a first VPN, wherein more than one organization or VPN site is participating in the first VPN with at least one device,
maintaining in a second VPN Information Provider (VIP) VPN configurations of VPN devices belonging to a second VPN,
providing to a first VPN device belonging to the first and second VPNs, VPN configuration of at least one other VPN device belonging to the first centralized VPN from the first VIP and VPN configuration of at least one other VPN device belonging to the second VPN from the second VIP, and
managing a subset of security aspects of said first VPN device belonging to the first VPN from at least one other management system separate from the first centralized VIP, wherein said subset of security aspects should not be shared by all organizations, VPN sites or VPN devices belonging to the first VPN.

12. The method of claim 11, wherein said configuration of at least one other VPN device is provided to said first VPN device via at least one other management system.

13. The method of claim 11, wherein said configuration of at least one other VPN device is provided directly to said first VPN device.

14. The method of claim 11, further comprising:
defining said VPN configurations of said VPN devices belonging to the first and second VPNs in at least one other management system, and
providing said VPN configurations to the VIPs for maintenance.

15. A method of claim 11, further comprising:
defining said VPN configurations of said VPN devices belonging to the first VPN in the first centralized VIP and said VPN configurations of said VPN devices belonging to the second VPN in the second VIP, and
providing said VPN configurations to respective VPN devices.

16. The method of claim 11, wherein the providing of VPN configuration of at least one other VPN device belonging to the first VPN from the first VIP and VPN configuration of at least one other VPN device belonging to the second VPN from the second VIP comprises:
sending to VPN devices belonging to a VPN, information about the VPN configurations maintained in the respective VIP,
receiving from a first VPN device belonging to the VPN, a request for VPN configuration of another VPN device belonging to the VPN, and
sending to said first VPN device belonging to the VPN, the VPN configuration of the other VPN device as a response to the request.

17. The method of claim 16, wherein said information about the VPN configurations maintained in the VIP is a set of addresses included in the first VPN, said request from the first VPN device comprises an address included in the first VPN, and said other VPN device is identified in the VIP by finding a VPN device related to said address.

18. The method of claim 16, wherein said information about the VPN configurations maintained in the first centralized VIP is a set of addresses included in the first VPN, and said information is sent after a change in the set of addresses included in the first VPN, or after a predefined time has elapsed since the information was sent the last time.

19. The method of claim 11, wherein the providing of VPN configuration of at least one other VPN device belonging to the first VPN from the first centralized VIP and VPN configuration of at least one other VPN device belonging to the second VIP comprises sending to VPN devices belonging to a VPN, VPN configurations maintained in the respective VIP.

20. A method of claim 19, wherein said VPN configurations maintained in the first centralized VIP are sent after a new VPN configuration has been added to the first centralized VIP, after an old VPN configuration has been removed from the first centralized VIP, after a VPN configuration of at least one VPN device has been changed in the first centralized VIP, or after a predefined time has elapsed since the configurations were sent the last time.

21. A method for handling Virtual Private Network (VPN) configuration, the method comprising:
   maintaining in a first centralized VPN Information Provider, VIP, multiple VPN configurations of VPN devices belonging to a first VPN, wherein more than one organization or VPN site is participating in the first VPN with at least one device,
   providing to VPN devices belonging to the first VPN, information about the VPN configurations maintained in the first centralized VIP,
   receiving from a first VPN device belonging to the first VPN, a request for VPN configuration of another VPN device of another organization participating in the first VPN,
   sending to said first VPN device belonging to the first VPN, the VPN configuration of the other VPN device as a response to the request, and
   managing a subset of security aspects of said first VPN device belonging to the first VPN from at least one other management system separate from the first centralized VIP, wherein said subset of security aspects should not be shared by all organizations, VPN sites or VPN devices belonging to the first VPN.

22. A system for managing Virtual Private Network (VPN) devices, the system comprising:
   at least two VPN devices belonging to a first VPN, wherein more than one organization or VPN site is participating in said VPN with at least one device,
   a first centralized VPN Information Provider (VIP) system maintaining VPN configurations of VPN devices belonging to the first VPN,
   at least one other management system separate from the first centralized VIP managing a subset of security aspects of said VPN devices belonging to the first VPN, when said a subset of security aspects should not be shared by all organizations, VPN sites or VPN devices belonging to the first VPN, while
   the VPN devices are adapted to receive from the at least one other management system, a first part of VPN configuration, and from the VIP, a second part of VPN configuration, which comprises VPN configuration of at least one other VPN device of another organization participating in the first VPN.

23. The system of claim 22, wherein the first part of configuration comprises VPN configuration and/or access rule configuration.

24. A Virtual Private Network (VPN) Information Provider (VIP) apparatus comprising:
   a mechanism for maintaining VPN configurations of VPN devices belonging to a first VPN, wherein more than one organization or VPN site is participating in said VPN with at least one device,
   a mechanism for providing to VPN devices belonging to the first VPN, information about the VPN configurations maintained in the VIP,
   a mechanism for receiving from a first VPN device belonging to the first VPN, a request for VPN configuration of another VPN device of another organization participating in the first VPN,
   a mechanism for sending to said first VPN device belonging to the first VPN, the VPN configuration of the other VPN device as a response to the request, and
   a mechanism for managing a subset of security aspects of said first VPN device belonging to the first VPN from at least one other management system separate from the first centralized VIP, wherein said subset of security aspects should not be shared by all organizations, VPN sites or VPN devices belonging to the first VPN.

25. A computer-readable memory device, comprising program code which, when executed on a computer device, causes the computer device to provide a Virtual Private Network (VPN) Information Provider (VIP) functionality comprising:
   maintaining in a first centralized VIP, multiple VPN configurations of VPN devices belonging to a first VPN, wherein more than one organization or VPN site is participating in the first VPN with at least one device,
   providing to VPN devices belonging to the first VPN, information about the VPN configurations maintained in the first centralized VIP,
   receiving from a first VPN device belonging to the first VPN, a request for VPN configuration of another VPN device of another organization participating in the first VPN,
   sending to said first VPN device belonging to the first VPN, the VPN configuration of the other VPN device of the other organization as a response to the request, and
   managing a subset of security aspects of said first VPN device belonging to the first VPN from at least one other management system separate from the first centralized VIP, wherein said subset of security aspects should not be shared by all organizations, VPN sites or VPN devices belonging to the first VPN.

* * * * *